United States Patent [19]

Franz et al.

[11] 3,713,271
[45] Jan. 30, 1973

[54] PROCESS AND APPARATUS FOR RECOVERING A GAS CONSTITUENT BY MEMBRANE SEPARATION

[75] Inventors: William F. Franz, Gardiner; Howard V. Hess, Glenham, both of N.Y.

[73] Assignee: Texaco Inc., New York, N.Y.

[22] Filed: Oct. 9, 1970

[21] Appl. No.: 79,410

[52] U.S. Cl. ............................ 55/16, 55/68, 55/158
[51] Int. Cl. ............................................ B01d 59/10
[58] Field of Search ......................... 55/16, 68, 158

[56] References Cited

UNITED STATES PATENTS

| 3,144,313 | 8/1964 | Pfefferle | 55/16 |
| 2,540,152 | 2/1951 | Weller | 55/16 |
| 3,463,603 | 8/1969 | Freitas et al. | 55/68 |
| 3,266,220 | 8/1966 | Woertz | 55/68 |

*Primary Examiner*—Charles N. Hart
*Attorney*—Thomas H. Whaley and Carl G. Reis

[57] ABSTRACT

A process or system employing membrane separation to recover helium from a petroleum gas well. It includes pressure actuated compressing apparatus connected to the membrane separator so as to automatically compress the recovered helium.

5 Claims, 2 Drawing Figures

3,713,271

PROCESS AND APPARATUS FOR RECOVERING A GAS CONSTITUENT BY MEMBRANE SEPARATION

BACKGROUND OF THE INVENTION

1. Field of the Invention

This invention concerns membrane separation of a constituent gas. MOre specifically, it relates to the application of membrane separation to natural gas supplies so as to recover a particular constituent, e.g. helium.

2. Description of the Prior Art

Heretofore there have been developed various structures to act as membrane separators for removing a specific constituent from a mixture of gases. Such arrangements have ordinarily involved a plurality of stages for the permeation separating steps and circulation of the gases has been carried out by pumping connections. Such pumping requires considerable energy because the permeation product is only a small percentage of the total volume of gases being circulated. Also, while natural gas often contains some helium which would be a desirable product to recover, heretofore the processes for making such recovery have not been attractive from an economic or practical point of view. This is especially true in the situations where the natural gas is high in nitrogen content so as to be too lean to support combustion.

Consequently, it is an object of this invention to provide a system, or method, for recovering a desired constituent gas from a mixture where the mixture exists in substantial quantity and under considerable pressure.

SUMMARY OF THE INVENTION

Briefly, the invention concerns a process for recovering a constituent from a gas mixture by using membrane separation. The process is applicable to a situation wherein there is a source of said gas mixture under pressure which may be applied to membrane separation means. Such separation means has an inlet for said gas mixture, an effluent gas outlet under pressure, and a permeation product outlet. The process comprises a step of applying said effluent gas pressure to compress said permeation product for recovery thereof.

Again, briefly, the invention concerns a system for recovering a constituent gas from a mixture under pressure wherein said constituent is a small percentage of said mixture. The system comprises a source of said mixture under pressure, and membrane means for separating said constituent at a reduced pressure. The membrane has an inlet for said mixture and an effluent gas outlet under pressure, as well as permeation product outlet. The system also comprises pressure transfer means having an expander section connected mechanically to a compressor section as well as means for connecting said source to said membrane means inlet. The system additionally comprises means for connecting said effluent gas outlet to said expander section and means for connecting said permeation product outlet to said compressor section.

Once more, the invention may be described as a system for recovering helium from a natural gas well having a supply of petroleum gas under pressure. The system comprises in combination membrane means for separating said helium. Such means has an inlet for said petroleum gas, an effluent gas outlet and an outlet for the permeation product from said membrane. The system also comprises means for removing carbon dioxide gas from said petroleum gas, and means for connecting said supply of petroleum gas to said $CO_2$ removing means. The system additionally comprises pressure actuated means for compressing said permeation product. This pressure means has an input expansion side and an output compression side. The system also comprises means for connecting said supply of petroleum gas and said $CO_2$ removing means to said input side of the said pressure means. Also, the system comprises a storage tank for said helium and first means for connecting said permeation product outlet to said compression side as well as second means for connecting said compression side to said storage tank for storing the recovered helium.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein.

DESCRIPTION OF THE PREFERRED EMBODIMENT

Figure 1:
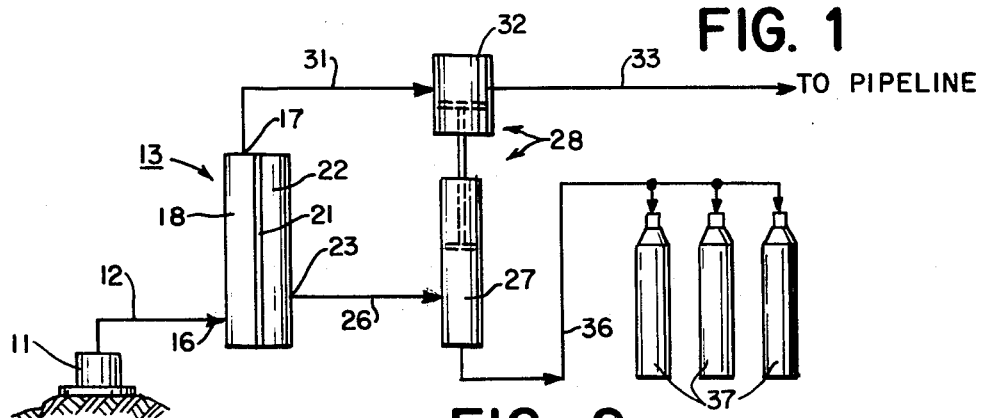
FIG. 1 is a schematic diagram illustrating a simplified system according to the invention.

With reference to FIG. 1, it is pointed out that a typical application of the invention relates to the recovery of helium from petroleum gas that is available under natural pressure. Thus, there is illustrated a well head 11 at the top of a well that contains natural gas under pressure. From the well head 11 petroleum gas is piped over a connecting line 12 to a membrane means 13 for separating helium from the gas mixture. It will be appreciated that such a separating device is known per se. However, in a combination according to this invention it is used with a supply of natural gas under pressure which permits the system to provide a continuous and unattended recovery of a desired constituent gas, e.g. helium, by merely making use of the energy from the natural gas pressure.

The so-called "membrane means" 13 may take various forms and is sometimes known as a permeator, since the separation of a desired constituent gas is affected by a process of permeating such gas through a membrane for separation from the gas mixture. Thus, the membrane means or permeator 13 has an inlet 16 for the petroleum gas from line 12, and an outlet 17 for effluent gas from a high pressure side 18 of the permeator 13. On the other side of a dividing wall, or membrane, 21 there is a low pressure chamber 22 that will contain the permeation product i.e. helium gas in this case, which has permeated through the membrane 21. There is another outlet 23 that has a connecting line 26 leading therefrom to an output or compression side 27 of a pressure actuated means 28.

It will be observed that there is a connecting line 31 that leads from the outlet 17 to an expansion side 32 of the means 28. Also, there is a connecting line 33 that leads from the expansion side 32 to a pipe line or the like as indicated by the caption "To Pipeline."

Another connection from the compression side 27 of the pressure actuated means 28, leads out through a connecting line 36 to input connections of a plurality of pressure tanks 37.

It will be noted that with a combination of elements such as those illustrated schematically in FIG. 1, it is possible to provide for recovery of a valuable constituent, e.g. helium, from the mixture of gases that are taken from a natural petroleum well. Furthermore, such recovery may be unattended, and it is feasible for use under circumstances where the petroleum gases are too lean for converting the energy therein by means of combustion.

Figure 2:
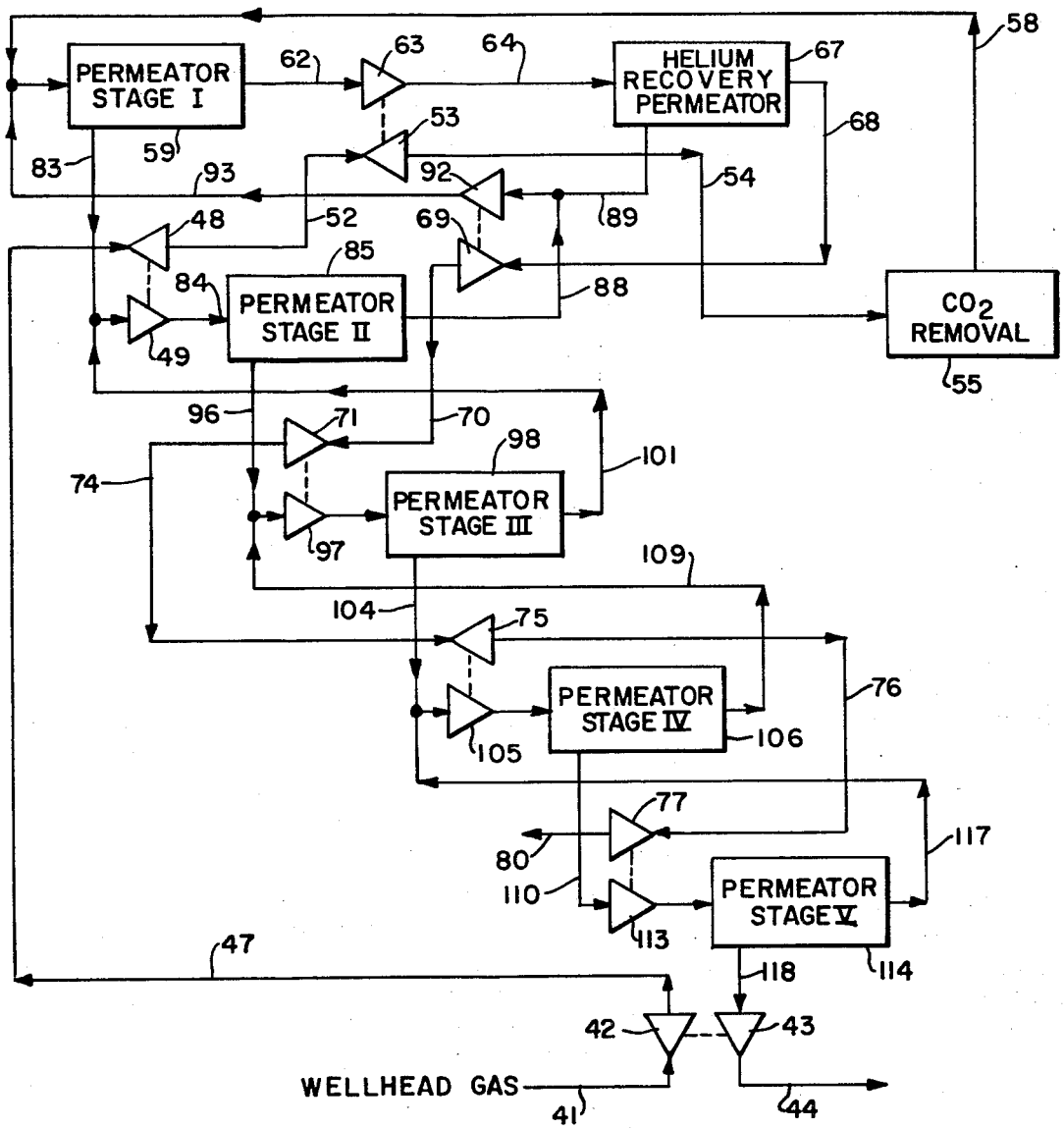
FIG. 2 is a block diagram schematically illustrating a plural stage separation means along with a $CO_2$ removal unit, all for carrying out the invention.

Referring to FIG. 2, it will be appreciated that a practical permeation type separator involves a plurality of stages for obtaining a desirably purified constituent or permeation product. Furthermore, in accordance with the invention a pressure intensifier or pressure recovery device may be employed in making use of the energy from natural pressure existing on the petroleum gases as they are found, prior to the emergence from a well.

The particular form of a separator and likewise of a pressure recovery device is not part, per se, of the invention. However, in determining the practical feasibility, it has been found that a plural stage separator along with plural transfers mechanically of the pressure energy by expansion, to pumping energy for circulation or compression at various stages, could be employed. It will be understood that the volume of petroleum gases is relatively unlimited for the purposes of this operation and the pressure at the source will remain at some adequate level.

After the last stage, it is desirable to compress the recovered constituent gas. This may be accomplished because of the relatively small volume of constituent gas, and the pressure may even be increased.

An idealized system with five separation stages as well as a so-called helium recovery stage, is illustrated in FIG. 2. This system is for recovering helium from natural gas. It will be observed that there is a line 41 with the caption Wellhead Gas applied. This brings well head gas into an expansion element 42 which actuates a compression element 43 to make a final compression of the recovered helium gas before it is delivered through a line 44.

The system between the inlet line 41 and the outlet line 44 for the recovered helium, is schematically shown, but it will be described with relation to an example that provides the results of calculations to confirm the feasibility of the system. Prior to describing that example, elements of the illustrated system will be referred to as the flow of gases through the system is traced.

Thus, the well head gases leaving expansion element 42 travel over a line 47 which leads into an expansion element 48. This element 48 is mechanically connected (as indicated by the dashed line) to a compression element 49 which acts further along in the system, as will be described more fully below.

The well head gases continue on from expansion element 48 through a line 52 to another expansion element 53. Then after these pressure drops, the gases go through a line 54 to the input side of a $CO_2$ remover 55.

It will be understood that the removal of $CO_2$ may be accomplished with various known arrangements. This step is necessary for the proper operation of the permeators. The principle involved is that of scrubbing a $CO_2$ containing gas with an alkaline solution. Commonly used materials are aqueous carbonate-bicarbonate of either sodium or potassium, or aqueous solutions of either mono-, di, or triethanolamine.

After removal of the carbon dioxide from the petroleum gas mixture with a small pressure drop, the gases continue through a line 58 to an input side of a first permeator stage 59 of the helium separation system. The effluent gases, still under pressure, travel through a line 62 to a compressor section 63 and then through a line 64 to an input of helium recovery permeator 67. The effluent gases still under considerable pressure continue to flow from the output of the permeator through a line 68 to another expander element 69. Then they continue on via a line 70 to another expander element 71. Thereafter, they continue through a line 74 to expander element 75 and then through a line 76 to a final expander element 77. The output effluent gases continue through a line 80 that may be connected for any desired disposition, e.g. to a pipe line as is indicated by the caption in FIG. 1.

The permeation product output from the first stage 59 travels through a line 83 to the input of the compressor element 49 which has its output connected through a line 84 to the inlet of a second stage 85 of the separator system. The effluent gas outlet from this stage 85 is circulated back through a line 88 which connects into a line 89 coming from the permeator 67. These two lines join and feed into a compressor element 92 that has its output connected through a line 93 into the input of the first stage 59 by joining the line 58.

It may be noted that where two streams such as those just described, exist at different pressures and are combined and raised to a higher pressure, the connections (not shown) would be such that the lower pressure stream would enter the first stage of the compressor (e.g. compressor 92) while the higher pressure stream would enter a higher compression stage where interstage pressure matches such higher pressure. This is true throughout the system, wherever applicable, even though the flow diagram (FIG. 2) merely shows a joinder of the two streams.

The permeation product output from the second stage 85 flows through a line 96 to another compressor element 97 that has its outlet connected to the input of a third stage permeator 98. The effluent gas output from stage 98 is recirculated back through a line 101 to join the line 83 both of which are connected to the input of the compressor element 49 that feeds the input to the second stage permeator 85.

Permeation product output from the third stage 98 goes through a line 104 to the input of a compressor element 105. The output of this compressor feeds into a fourth permeator stage 106, and the effluent gas outlet goes to join the permeation product from the second stage permeator at the input of the compressor element 97, through a line 109.

Finally, the permeation product from the fourth stage 106 goes through a line 110 to a compressor element 113 the output from which goes to the input of a fifth and last stage 114. The effluent gas outlet from stage 114 recirculates back through a line 117 and joins the permeation product in line 104 to return into the previous stage 106 via the compressor element 105. Permeation product outlet from the final stage 114 goes to the input of the compressor element 43 through a line 118. This compressor element delivers the purified helium through the line 44.

It is contemplated that this invention should provide an economical way of recovering helium from natural gas that contains from 1 to 8 percent helium. An example of the operating conditions for a system as illustrated and described above with regard to FIG. 2, shows an overall operation that separates 99.995 percent pure helium from 1.28 MM SCF/day of a gas that is available at the wellhead at 2,240 pounds per square inch gage pressure. The gas mixture contains 6.2 percent by volume of helium, 53.7 percent by volume of nitrogen, 22.0 percent by volume of $CO_2$, and 14.0 percent by volume of methane plus 4.1 percent by volume of other hydrocarbons.

In the example, the wellhead gas is expanded from the 2,240 p.s.i.g. to about 600 p.s.i.g. permeation pressure and the available energy is used to compress the helium that is produced to 2,480 p.s.i.g. for storage and/or distribution. In addition, the wellhead pressure energy is used to compress two of the largest internal circulation streams of the system. The additional compression work required to recompress the low pressure helium permeation product to the succeeding stage inlet pressures and to supply the pressure drop through the later permeator stages is obtained from the helium denuded off gas (effluent from the permeator 67) that is available at about 400 p.s.i.g.

The examples shows flows expressed in standard cubic feet per minute (SCFM), pressures expressed in pounds per square inch gage (p.s.i.g.) and the gas quantities expressed in percent by volume. It identifies the streams by number which correspond with the flow line illustrated in FIG. 2. It will be understood that although the compression energy balance was calculated assuming reversible adiabatic compression and expansion, with no allowance made for mechanical efficiency, the calculations indicated that in this case there would be excess pressure energy available to compensate for irreversibilities.

comprising in combination
1. membrane means for separating said helium having
   a. an inlet for said petroleum gas,
   b. an effluent gas outlet, and
   c. an outlet for the permeation product from said membrane,
2. means for removing carbon dioxide from said petroleum gas,
3. means for connecting said supply of petroleum gas to said $CO_2$ removing means (2)
4. pressure actuated means for compressing said permeation product having
   d. an input expansion side, and
   e. an output compression side,
5. means for connecting said supply of petroleum gas and said $CO_2$ removing means to said input side (d) of said pressure means (4),
6. a storage tank for said helium, and
7. first means for connecting said outlet (c) to said compression side (e), and
8. second means for connecting said compression side (e) to said storage tank (6) for storing the recovered helium.

2. A system according to claim 1 wherein said membrane means (1) comprises a plurality of stages, and
   means for interconnecting said stages to recirculate said permeation products and said effluent gases after the initial stages.

3. A system according to claim 2 wherein there are six stages with two initial stages.

4. A system for recovering helium from a mixture under pressure wherein said helium is a small percentage of said mixture, comprising in combination
   a natural-gas well source of said mixture under pressure,
   membrane means for separating said constituent at a reduced pressure having a plurality of stages for increasing the concentration of helium and each stage having an inlet for said mixture and an effluent gas outlet under pressure and a permeation product outlet,
   pressure transfer means having an expander section connected mechanically to a compressor section,

| Stream number | 41 | 47 | 52 | 54 | 58 | Input to 59 | 62 | 64 | 68 | 70 |
|---|---|---|---|---|---|---|---|---|---|---|
| Flow, s.c.f.m. | 889 | 889 | 889 | 889 | 694.4 | 824.5 | 695.9 | 695.9 | 637.2 | 637.2 |
| Pressure, p.s.i.g. | 2,240 | 1,835 | 909 | 640 | 600 | 600 | 384 | 600 | 402 | 288 |
| $N_2$, $CH_4$, etc., vol. percent | 93.8 | 93.8 | 93.8 | 93.8 | 92.1 | 91.8 | 99.5 | 99.5 | 100.0 | 100.0 |
| $H_e$, vol. percent | 6.2 | 6.2 | 6.2 | 6.2 | 7.95 | 8.2 | 0.5 | 0.5 | 0.025 | 0.025 |

| Stream number | 74 | 76 | 80 | 89 | 83 | 84 | 88 | 96 | Input to 98 | 101 |
|---|---|---|---|---|---|---|---|---|---|---|
| Flow, s.c.f.m. | 637.2 | 637.2 | 637.2 | 58.7 | 128.6 | 138.8 | 71.4 | 67.3 | 75.3 | 10.2 |
| Pressure, p.s.i.g. | 194 | 141 | 99 | 5 | 5 | 600 | 270 | 5 | 400 | 355 |
| $N_2$, $CH_4$, etc., vol. percent | 100.0 | 100.0 | 100.0 | 94.5 | 50.0 | 48.4 | 90.0 | 4.4 | 4.0 | 2.9 |
| $H_e$, vol. percent | 0.025 | 0.025 | 0.025 | 5.5 | 50.0 | 51.6 | 10.0 | 95.6 | 96.0 | 97.1 |

| Stream number | 104 | 109 | Input to 106 | 110 | Input to 114 | 117 | 118 | 44 |
|---|---|---|---|---|---|---|---|---|
| Flow, s.c.f.m. | 65.1 | 8.0 | 79.4 | 71.4 | 71.4 | 14.3 | 57.2 | 57.2 |
| Pressure, p.s.i.g. | 5 | 352 | 400 | 5 | 400 | 336 | 5 | 2,480 |
| $N_1$, $CH_4$, etc., vol. percent | 0.1 | 0.75 | 0.1 | 0.0 | 0.0 | 0.0 | 0.0 | 0 |
| $H_e$, vol. percent | 99.9 | 99.25 | 99.91 | 99.983 | 99.983 | 99.937 | 99.995 | 99.995 |

The foregoing description of the invention has been made in considerable detail in accordance with the applicable statutes. However, this is not to be taken as in any way limiting the invention but merely as being descriptive thereof.

We claim:

1. A system for recovering helium from a natural gas well having a supply of petroleum gas under pressure, means for connecting said source to said membrane means inlet,
means for connecting said effluent gas outlet to said expander section,
means for connecting said permeation product outlet to said compressor section,
storage means for said permeation product,
means for connecting said compressor section to said storage means, and means for removing carbon dioxide from said mixture prior to introduction into said membrane means inlet.

5. Process for recovering helium from a petroleum gas mixture by membrane separation wherein the source of natural gas mixture under pressure is a well the gas from which is applied to membrane separation means, said separation means having an inlet for said gas mixture, an effluent gas outlet under pressure and a permeation product outlet, comprising the steps of applying merely said effluent gas pressure to compress said permeation product for recovery thereof, and removing carbon dioxide from said source prior to applying said gas mixture to said separation means.

* * * * *